(12) United States Patent
Neuneier et al.

(10) Patent No.: US 8,700,647 B2
(45) Date of Patent: Apr. 15, 2014

(54) COMMUNICATION SYSTEM FOR PROCESSING DATA

(75) Inventors: Ralph Neuneier, Princeton, NJ (US); Michal Skubacz, Gröbenzelll (DE)

(73) Assignee: Siemens Aktiengesellschaft, Munich (DE)

( * ) Notice: Subject to any disclaimer, the term of this patent is extended or adjusted under 35 U.S.C. 154(b) by 1061 days.

(21) Appl. No.: 11/763,008

(22) Filed: Jun. 14, 2007

(65) Prior Publication Data
US 2007/0294261 A1    Dec. 20, 2007

(30) Foreign Application Priority Data
Jun. 14, 2006   (DE) .......................... 10 2006 027 664

(51) Int. Cl.
*G06F 17/30*    (2006.01)
(52) U.S. Cl.
USPC .......................................... 707/756; 707/809
(58) Field of Classification Search
USPC ...................... 707/100, 101, 104.1, 756, 809; 709/203, 219, 201, 206
See application file for complete search history.

(56) References Cited

U.S. PATENT DOCUMENTS

| | | | | |
|---|---|---|---|---|
| 5,754,772 A | * | 5/1998 | Leaf .............................. | 709/203 |
| 6,163,802 A | | 12/2000 | Lin et al. | |
| 6,604,131 B1 | * | 8/2003 | Warris et al. .................. | 709/205 |
| 6,611,839 B1 | * | 8/2003 | Nwabueze .................... | 707/101 |
| 6,615,253 B1 | * | 9/2003 | Bowman-Amuah .......... | 709/219 |
| 7,089,560 B1 | * | 8/2006 | Uhler et al. ................... | 719/311 |
| 2002/0091814 A1 | * | 7/2002 | Arendt et al. ................. | 709/223 |
| 2003/0023632 A1 | * | 1/2003 | Ries et al. ..................... | 707/513 |
| 2003/0229900 A1 | * | 12/2003 | Reisman ........................ | 725/87 |
| 2004/0167859 A1 | * | 8/2004 | Mirabella ...................... | 705/59 |
| 2005/0281276 A1 | | 12/2005 | West et al. | |

* cited by examiner

*Primary Examiner* — Shiow-Jy Fan
(74) *Attorney, Agent, or Firm* — Staas & Halsey LLP (57) ABSTRACT

In a plurality of sub-systems, a respective sub-system processes data according to a logic system specific to the respective sub-system. At least some of the sub-systems respectively include at least one acquisition unit which is configured in such a way that it acquires information relating to the processed data of the respective sub-system and converts it into a predefined data structure which is the same for at least some of the sub-systems. the acquisition units are connected to a common analysis unit which during operation of the communication system receives information from the acquisition units relating to the processed data in the predefined data structure and analyzes it in relation to predefined criteria.

14 Claims, 7 Drawing Sheets

COMMUNICATION SYSTEM FOR PROCESSING DATA

CROSS REFERENCE TO RELATED APPLICATIONS

This application is based on and hereby claims priority to German Application No. 10 2006 027 664.7 filed on Jun. 14, 2006, the contents of which are hereby incorporated by reference.

BACKGROUND

Described below is a communication system for processing data and to a corresponding method for processing data.

Nowadays complex and distributed computer architectures are often used by companies to allow company-wide communication and communication with external business partners. Examples of structures of this type are the internet, the company-internal intranet and the extranet, which constitutes an expansion of the internet and connects two or more intranets via an internet connection.

To optimize the processes that run in the architectures it is often desirable to analyze and monitor the data that is processed therein. A large number of methods are known from the related art by which data processing in communication systems can be monitored. Such methods include for example the analysis of protocol files or what are known as network sniffer software solutions.

In distributed communication systems which have a large number of sub-systems that independently process data using a specific logic system there exists the problem that often complex, separate mechanisms for monitoring data processing have to be implemented for each sub-system. This leads to complex network structures with high expenditure on hardware and software.

SUMMARY

An aspect is therefore to create a distributed communication system which easily ensures analysis of data processed in the communication system.

The communication system includes a plurality of sub-systems, a respective sub-system processing data according to a logic system specific to the respective sub-system. At least some of the sub-systems respectively include at least one acquisition unit which is configured in such a way that it acquires information relating to the processed data of the respective sub-system and converts it into a predefined data structure which is the same for at least some of the sub-systems. The acquisition units are in turn connected to a common analysis unit which during operation of the communication system receives information from the acquisition units relating to the processed data in the predefined data structure and analyzes it in relation to predefined criteria.

The communication system decouples the acquisition of processed data from analysis. In particular actual data acquisition is carried out locally in the individual sub-systems, separate acquisition units being used for this purpose. Since data acquisition is a simple processing process, acquisition units of this type can be easily implemented in the corresponding sub-systems. In particular a standard hardware component may be used which is appropriately adapted to the logic system of the individual sub-system by software. By contrast the data analysis, which requires significantly more resources and is of more complex configuration, carried out in the communication system is taken on by a central analysis system, it being ensured that the analysis system can process the information from all sub-systems. This is achieved in that a conversion into a predefined data structure is performed in the individual acquisition units, the structure being understood by the common analysis unit. Resources are thus saved in the communication system since a single analysis unit is provided for a large number of sub-systems and an analysis unit does not have to be separately integrated for each sub-system.

In an embodiment of the communication system a common interface is provided between the acquisition units and the common analysis unit, via which interface the acquisition units and the common analysis unit communicate with each other during operation of the communication system. A common interface of this kind is made possible in that data is transmitted to the analysis unit in a common, predefined data structure.

A particularly preferred field of application for the communication system is supplying web contents for a plurality of users. In a system of this kind a plurality of web systems are used as sub-systems, a respective web system processing web contents according to a logic system specific to the respective web system and supplying the contents to users. In this connection the logic system is in particular the manner in which web contents are linked to each other and structured. At least some of the web systems include at least one respective acquisition unit which is configured in such a way that it acquires information relating to web contents of the respective web system retrieved by users and converts them into a predefined data structure which is the same for at least some of the web systems.

In this connection the at least one acquisition unit preferably acquires the information relating to web contents retrieved by users at least partially via communication of the respective web system with user web browsers. In particular communication of the respective web system with user web browsers takes place via the HTTP protocol.

Any desired method known from the related art may be used as the method for acquiring the information relating to web contents retrieved by users. Methods of this kind are described for example in the specific description relating to FIGS. 2 and 3. For example the information relating to web contents retrieved by users is at least partially acquired via the requesting of web contents by a web browser with these methods. In this connection the information relating to web contents retrieved by users can be transmitted to the acquisition units via parameters in requests made by the web browsers.

In a further variant information relating to web contents retrieved by users is at least partially transmitted through to the acquisition units by way of redirection from links into web pages displayed by a web browser, in particular of HTML web pages. In this connection the links are preferably links to other web pages or links for downloading documents.

In a variant of the communication system, a plurality of web systems the information relating to web contents retrieved by users includes the URL (URL=Uniform Resource Locator) of a retrieved web page or file and/or the storage location of a retrieved web page or file and/or the storage location of a retrieved web page or file and/or the time at which a web page or file was retrieved. Comprehensive acquisition of statistically relevant information is ensured hereby.

In a further embodiment of the communication system at least some of the sub-systems include a content supplying unit, in particular a web server, for supplying the data of the respective sub-system and/or a content management unit for managing the data of the respective sub-system. A sub-system with a separate logic system for supplying and managing data is easily created hereby.

The at least one acquisition unit of a respective sub-system preferably cooperates with the content management unit of the respective sub-system in such a way that the information relating to the processed data acquired by the acquisition unit is supplemented by further information. This means that during analysis of the information, further information stored only locally in a content management unit can be used in addition to information supplied, by way of example, via a web browser.

In a particular embodiment of the communication system, the supplementary information is in particular meta information on web contents. In this connection meta information is data which contains information about other data. Examples of such meta information are the storage location of a retrieved web page or file and/or the author of a retrieved web page or file and/or the storage name of a retrieved web page or file.

In an embodiment of the communication system the information acquired by the acquisition units of the respective sub-system is stored in a local database in the respective sub-system. This local database can be easily accessed by the common analysis unit to analyze the information contained in the local databases. In this connection, the analysis unit is preferably configured in such a way that it statistically analyzes the information relating to the processed data in the predefined data structure.

The acquisition units can be integrated in the communication system in various ways. In a variant one or more acquisition unit(s) is/are each divided into at least one first sub-unit, which is used solely for acquiring information relating to the processed data, and at least one second sub-unit for further processing of the acquired information. Effective separation of the acquisition units into a front-end computer and a back-end computer is ensured hereby. The front-end computer is the first sub-unit which requires only a low computing capacity and only acquires data, in particular processes and forwards requests. By contrast the second sub-unit, which is the back-end computer, preferably has a higher computing capacity since it is used for further processing of the acquired information. In this connection further processing relates in particular to supplementing information with information from a content management unit, conversion of information and storing of information in a database.

In an embodiment of the communication system at least one of the sub-systems includes a plurality of content management units, in particular for supplying web contents for retrieval by a web browser, each content management unit containing a first sub-unit and all first sub-units splitting a common second sub-unit. Redundancy for the first sub-units is produced hereby, thus ensuring that failure of a first sub-unit does not lead to termination of communication with external web browsers. The provision of redundancy is less important in the second sub-unit since failure thereof does not affect the acquisition of information and hence does not result in termination of communication with external browsers. With this embodiment redundancy is thus only produced at the location at which it is particularly important, namely in the first sub-units. Production of this redundancy is associated with little cost since the first sub-units require only low computing power as their function is easy to execute.

In a further embodiment of the communication system a plurality of content supplying units is again supplied, each content supplying unit containing a first sub-unit and at least one of the content supplying units also containing a second sub-unit. In a further variant of the communication system division of the acquisition units into first and second sub-units may also be omitted, each content supplying unit preferably include an acquisition unit in this case. In any case one or more of the sub-system(s) should include at least two redundant acquisition units to produce redundancy.

In addition to the above-described communication system also relates to a method for processing data in a communication system, wherein:

a plurality of sub-systems in each case process data according to a logic system specific to the respective sub-system;

in at least some of the sub-systems information relating to the processed data of the respective system is acquired using at least one acquisition unit in each case and is converted into a predefined data structure which is the same for at least some of the sub-systems, the information relating to the processed data of the predefined data structure is sent from the acquisition units to a common analysis unit and is analyzed by the analysis unit.

BRIEF DESCRIPTION OF THE DRAWINGS

These and other objects and advantages will become more apparent and more readily appreciated from the following description of embodiments, taken in conjunction with the accompanying drawings of which.

DETAILED DESCRIPTION OF THE PREFERRED EMBODIMENT

Reference will now be made in detail to the embodiments, examples of which are illustrated in the accompanying drawings, wherein like reference numerals refer to like elements throughout.

Figure 1:
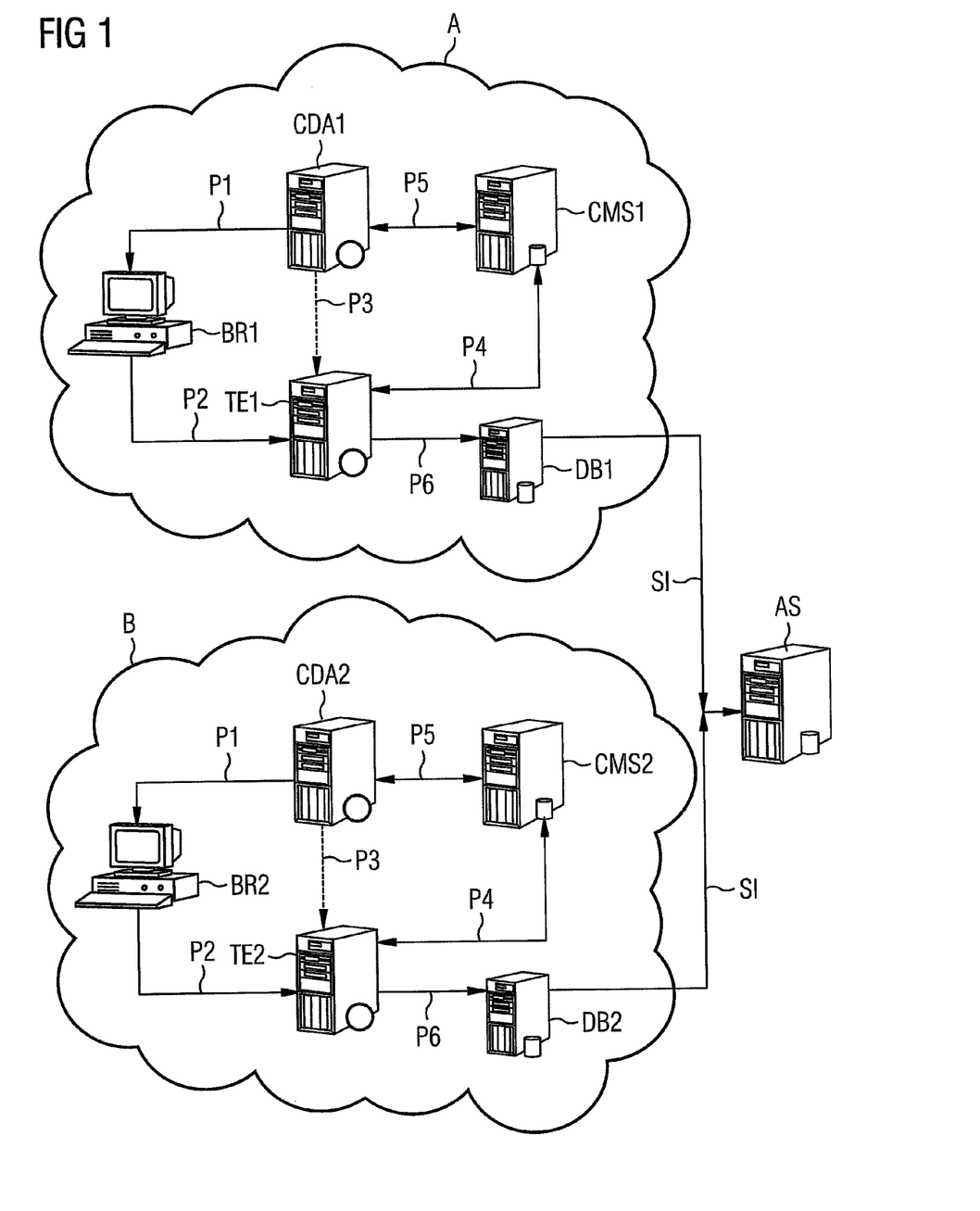
FIG. 1 shows a schematic diagram of an embodiment of the communication system.

FIG. 1 shows a schematic diagram of an embodiment of a communication system which includes two separate web systems A and B. The web systems A and B each include the same components and, more precisely, a front-end server in the form of a content supplying unit CDA1 or CDA2 (CDA=Content Delivery Application) and a back-end server in the form of a content management unit CMS1 or CMS2 (CMS=Content Management System). A respective browser BR1 or BR2 is supplied with web contents via the CDA1 or CDA2, the web contents in particular being web pages or downloadable files.

Each web system A and B uses its own logic system according to which the web pages and files are linked together. A separate, structured construction of the web contents to be supplied is thus created by the logic system of web systems A and B, wherein the logic systems of the individual web systems do not understand each other. Each of the web systems A and B also contains an acquisition unit in the form of what is known as "tracking engines" TE1 or TE2. In this connection these are data computers which understand the logic system of the local web systems A and B and are used to track the web contents retrieved by the users via the browsers BR1 and BR2 ("tracking"). The communication system is distinguished in that local tracking engines adjusted to the corresponding logic systems of systems A and B are used for systems A and B. Methods known from the related art are used in this connection for tracking the web contents, the individual tracking engines only being used for tracking and not for statistical evaluation of the tracked web contents, so all tracking engines can be easily adapted to the corresponding logic systems of the web systems A and B by corresponding software modifications.

When web contents are retrieved via the browsers BR1 and BR2 the web contents, or information relating to the web contents, retrieved by a user via the browsers is acquired in the communication system of FIG. 1 by corresponding software in the tracking engines TE1 and TE2. Information of this kind relates in particular to the URL of the retrieved web pages, the time the web page was retrieved and any other desired information which can be derived from the web contents retrieved by the browser. The web contents are supplied for the browsers and the information relating to web contents is acquired via the communication paths, indicated by corresponding arrows P1 and P2, which run from the content supplying unit CDA1 or CDA2, via the corresponding browser BR1 or BR2 to the tracking engines TE1 or TE2. Indirect communication, with interconnection of the browser, from the content supplying units CDA1 and CDA2 through to the tracking engines TE1 and TE2 is thus created, as is indicated by the arrow P3 in broken lines.

In the communication system of FIG. 1 the contents acquired from the browsers by the tracking engines are also supplemented by contents from the content management units CMS1 and CMS2. For this purpose there is direct communication connection between the corresponding tracking engines and content management units which is indicated in FIG. 1 by the double-headed arrow P4. FIG. 1 also reproduces the communication connection between the content supplying units CDA1 and CDA2 and the content management units CMS1 and CMS2 with double-headed arrows P5.

As mentioned above the information supplied by the browsers in the embodiment of FIG. 1 is supplemented by way of access to the content management units CMS1 and CSM2 with additional information. This supplementary information is available only locally in the web systems A and B. Such information is in particular meta information, i.e. data which contains information about other data. Examples of meta information of this type can be the author of a web page, which information is stored only locally in the web system and is not displayed by the browser. Any other desired information by way of recourse of the tracking engines to CMS1 and CMS2 in relation to the retrieved web pages or web contents may also be considered, in particular for statistical evaluation of the information relevant to the retrieved web contents.

According to the preceding description information relating to web contents retrieved via the browsers BR1 and BR2 is thus acquired by the acquisition units TE1 and TE2, this information being augmented by additional information from the data management units CMS1 and CMS2. The augmented information acquired in this way is finally converted in the tracking engines TE1 and TE2 in such a way that a uniform data structure is created which is the same for web systems A and B. The acquired and augmented information is thus processed in such a way that a standardized data format is predefined. The converted information is finally stored in corresponding databases DB1 and DB2, the connections between the tracking engines TE1 and TE2 through to the databases DB1 and DB2 being indicated by corresponding arrows P6.

The conversion just described of the acquired information relating to retrieved web contents is a fundamental feature. It is now possible to use a single, common analysis unit AS for the two web systems A and B although they use different logic systems to structure their web contents. For this purpose a common standardized interface SI is used between the database DB1 and the AS and between the database DB2 and the AS. The information, prepared in the uniform data format, relating to the retrieved web contents is transmitted via this interface SI and evaluated in the analysis unit AS according to statistical criteria. In this connection the analysis unit can acquire various sub-components which draw up different reports and evaluations on/of the acquired information.

The communication system just described has a range of advantages. In particular a higher data quality with respect to monitoring of the retrieved web contents is ensured since there is close integration of the acquisition unit for acquiring the retrieved web contents locally into the web systems that supply the web contents. The individual acquisition units only carry out the simple process of data acquisition and data conversion and may be easily adapted to the corresponding logic system of the relevant web systems by appropriate modification of their software. Only a single analysis unit, which can be used by a large number of acquisition units, has to be used in the communication system. The communication system ensures a high level of data accuracy since the web contents are monitored within the same domains and the users cannot easily avoid tracking of the retrieved web contents therefore. A further advantage of the communication system lies in the fact that it may be universally used for various scenarios and is not limited to the use described above in a communication system with various web systems. The method can in particular be used to track applications and to analyze the performance of computing processes in addition to tracking web contents. A further use is in portable platform applications. The method can also be used in systems for distributing multimedia data, such as in digital video broadcasting systems (DVB) for example. Other systems for using the communication system are home systems and the control of what are known as "Business Project Management Systems".

Figure 2:
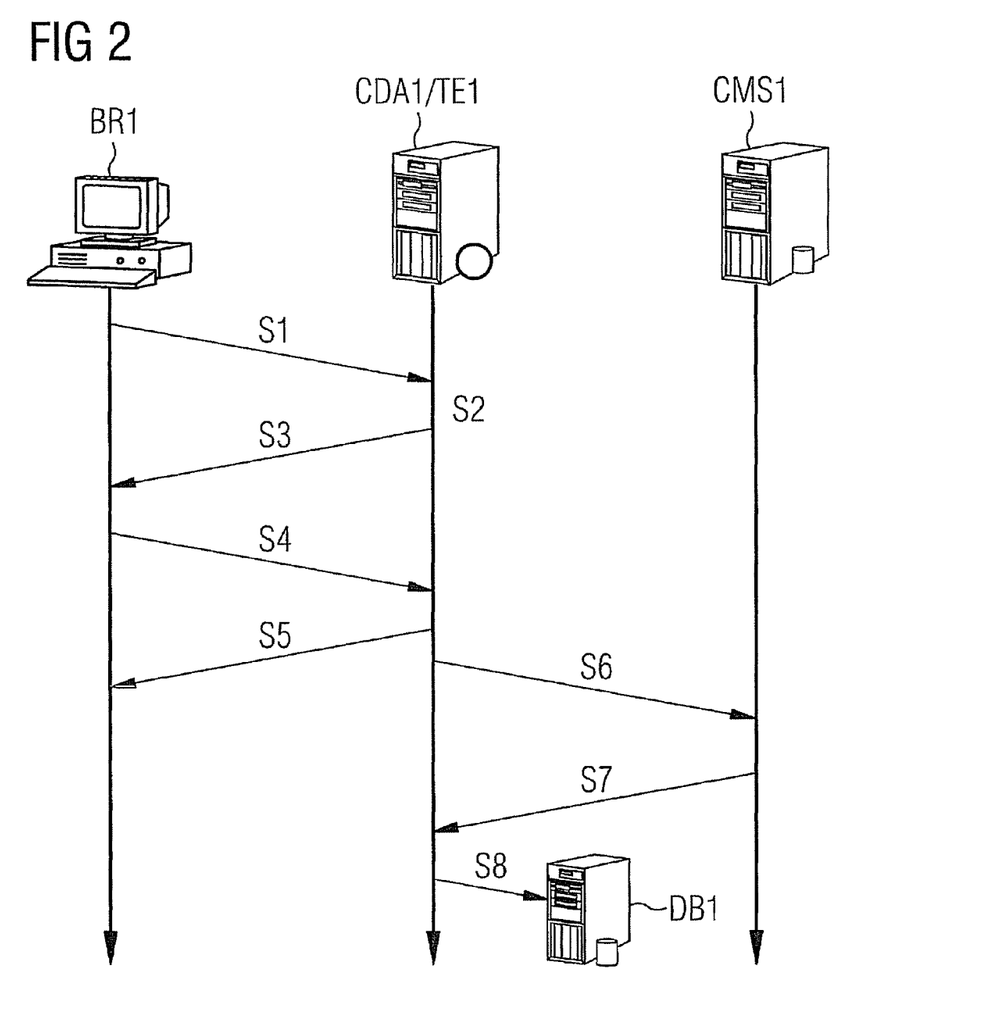
FIGS. 2 and 3 show embodiments of methods for tracking retrieved web contents which can be used in the communication system.
Figure 3:
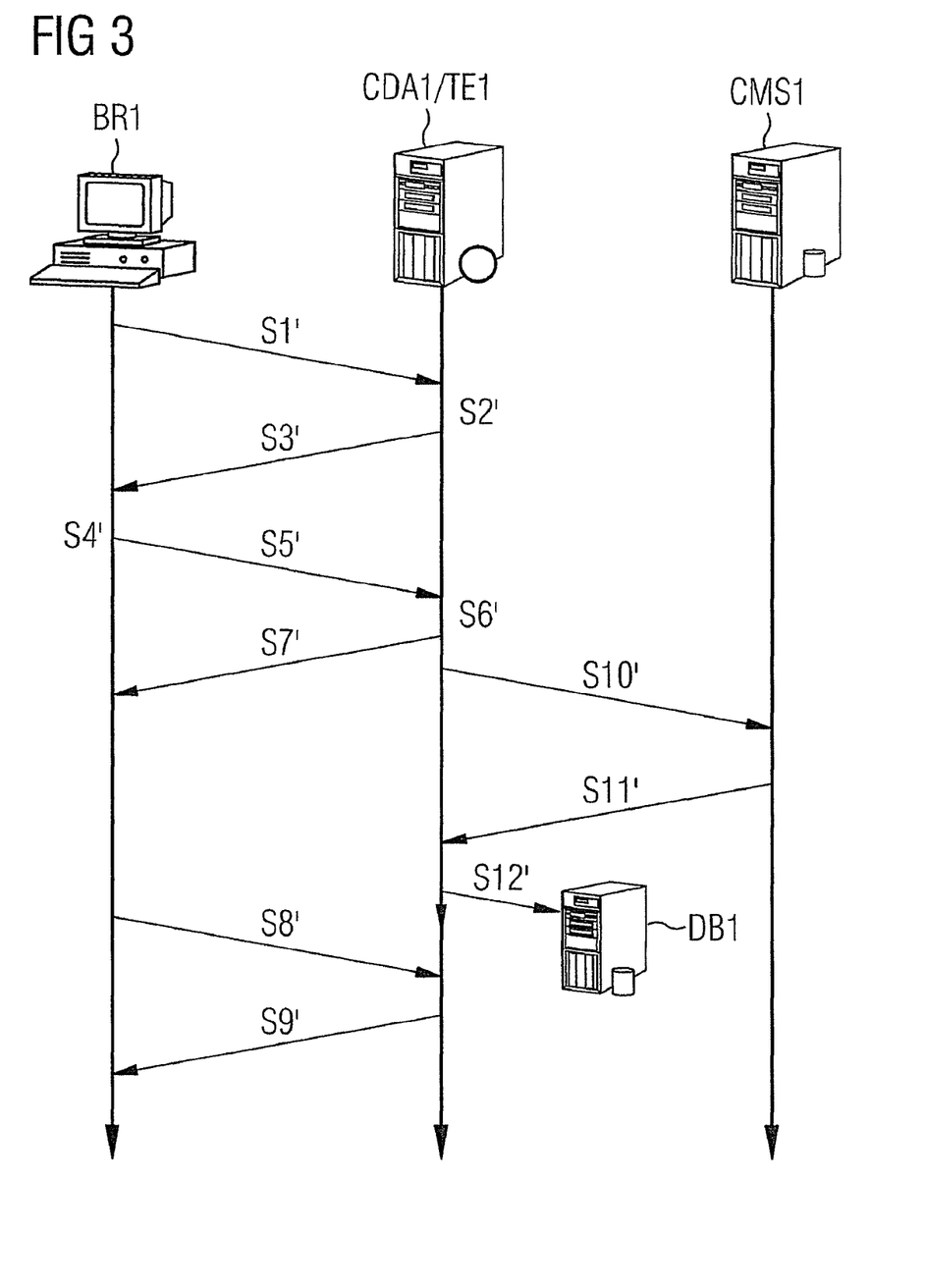

FIG. 2 and FIG. 3 show flow diagrams which reproduce two possible methods for tracking data in the web systems of FIG. 1. The message flows are described in this connection using web system A of FIG. 1 but may be analogously applied to web system B of FIG. 1.

FIG. 2 shows a scenario in which HTML documents are downloaded by the browser BR1 of web system A by a user or browser, this downloading process being monitored by the tracking engine TE1. First of all an HTTP request is sent in step S1 from the browser BR1 to the content supplying unit CDA1. In step S2 the content supplying unit CDA1 processes this request and produces a corresponding HTML document according to the request, a link to what is known as a hidden image being inserted in the HTML document. This hidden image is finally used for transmitting statistical information to the tracking engine TE1, as will be described below.

In step S2 the produced HTML document is finally transmitted to the browser BR1. The browser interprets the HTML code and displays the HTML document. At the same time, via the link to the hidden image the image is requested in step S4. The link is chosen in this connection such that it points at the tracking engine TE1. The HTTP request to ask for the image is parameterized in this connection and contains information relating to the HTML document requested in step S1, for example the information as to which content supplying unit or web server produced the HTML document. The information used for statistical evaluation in the analysis unit AS is thus supplied by the parameterized request. This information consequently constitutes the information, acquired by the acquisition unit, relating to the processed data.

After receiving the parameterized request the hidden image is finally transmitted from the tracking engine TE1 to the browser BR1, no further actions subsequently having to be carried out by the browser. Transmission of the image is identified in FIG. 2 by step S5. According to the embodiment described here the tracking engine TE1 still requests supplementary information relating to the web contents of the HTML document, this information not being directly contained in the HTML document but being acquirable only by a request to the data management unit CMS1 of the web system A. The tracking engine TE1 accordingly makes a database request, in particular an SQL request, of the content management unit CMS1 in step S6. The CMS1 makes this information, which, for example, is meta information, available to the tracking engine TE1 in step S7, the tracking engine then processes all acquired information and converts it into a uniform data structure which is stored in the database DB1 in step S8 and can then be processed by the analysis unit AS.

FIG. 3 shows a method with which HTML documents, which are not HTML documents, can be tracked by the tracking engine TE1. For this method the browser BR1 firstly sends an HTTP request in step S1' to the content supplying unit CDA1. This in turn produces an HTML document in step S2'. However, this document is modified in such a way that the contained external links or links for downloading files are not oriented directly at the corresponding URL but at the address of the tracking engine TE1, the HTML document also containing the actual destination URL as a parameter, however. The HTML document is transmitted in step S3' to the browser BR1. Finally, in step S4' the browser interprets this document and displays it.

If the user of the browser now clicks on the external link, or the download links, contained in the HTML document, a corresponding HTTP request is not routed directly to the destination URL but firstly to the tracking engine TE1 (step S5'). The tracking engine receives the HTTP request in step S6' and responds thereto with an HTTP response which contains what is known as an HTTP response 302 and the destination URL of the download link or the external links. Transmission of the HTTP response is indicated in FIG. 3 by step S7'. The browser BR1 can then download the data of the download link or access the external link from the destination URL, and this is indicated in FIG. 3 by step S8'. The data of the download link or the web contents of the external link is finally transmitted to the browser in step S9'.

In the method shown in FIG. 3 the data received in step S5' by the tracking engine in turn contains parameters which contain statistical information about the requested download links or external links. This information—analogously to FIG. 2—is supplemented by additional information which is not contained in the parameterized request but can only be retrieved by the content management unit CMS1. For this reason the tracking engine TE1 makes a request in step S10', relating to supplementary information, of the content management system CMS1, the request in particular being an SQL database request. In step S11' the supplementary information, which, for example, is meta information, is then transmitted to the tracking engine TE1 which converts this information into a data structure which is stored in the local database DB1 (step S12') and can be processed by the analysis unit AS.

Figure 4:
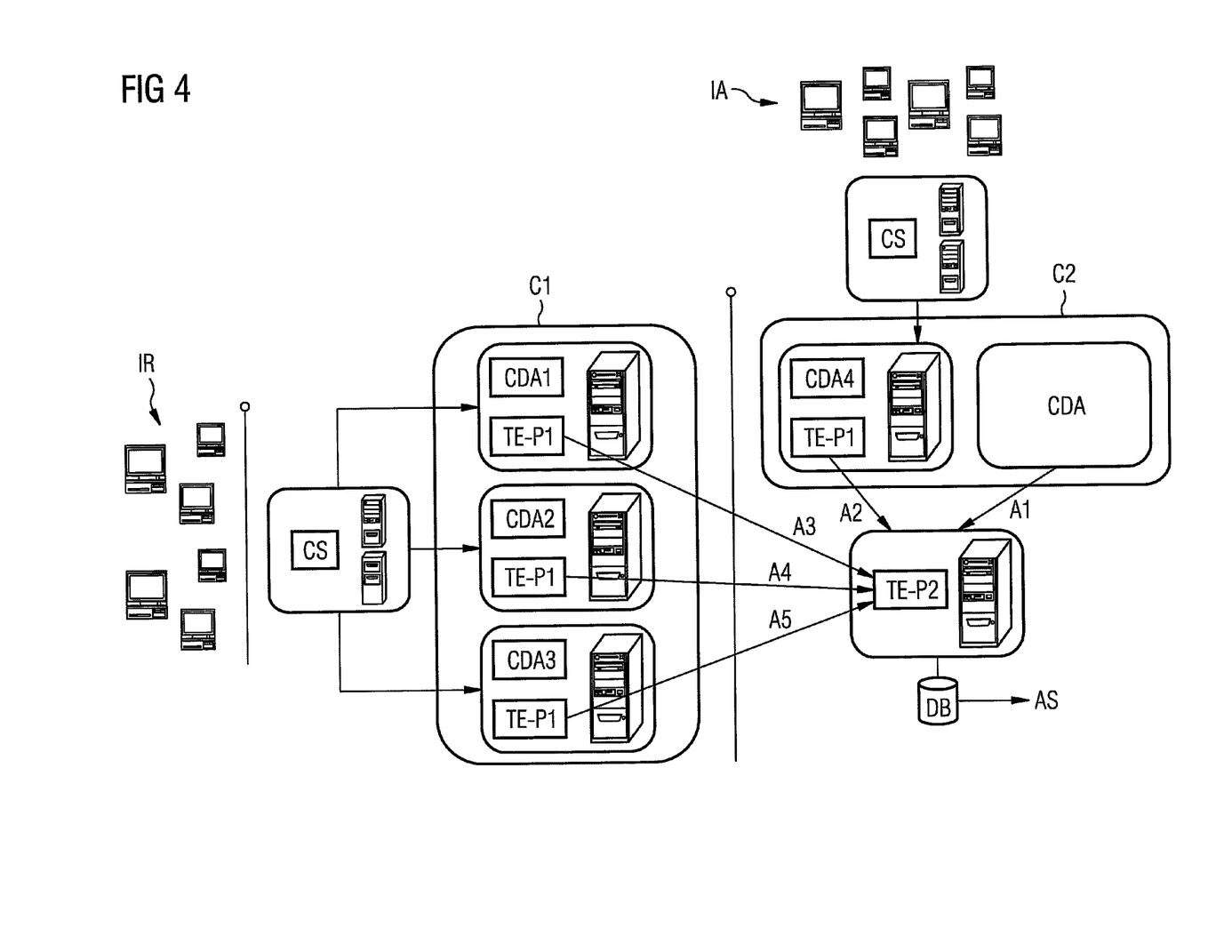
FIGS. 4 to 7 show embodiments which illustrate different integration possibilities for the acquisition units in the communication system.

FIG. 4 shows a schematic diagram of an embodiment of a web system in which a tracking engine is integrated. The web system shown in FIG. 4 contains two computer clusters C1 and C2 which are each connected by what are known as content switches CS to browsers in the internet IR or in a company-internal intranet IA. The individual browsers are schematically indicated in FIG. 4 by computer monitors. The web system, i.e. the clusters C1 and C2, can now be accessed via these browsers. Cluster C1 supplies web contents via three separate content supplying units CDA1, CDA2 and CDA3. Cluster C2 also contains a plurality of content supplying units, only the content supplying unit CDA4 being indicated. Further content supplying units of cluster C2 are not reproduced and are only indicated by the dummy character CDA. Here the web system according to FIG. 4 constitutes a sub-system, i.e. all content supplying units of the web system supply the web contents according to the same logic system.

The web system of FIG. 4 is distinguished by a distributed tracking engine which contains two types of sub-units TE-P1 and TE-P2. There are four sub-units TE-P1 in this connection which are each associated with one of the content supplying units CDA1 to CDA4 or are integrated in one of the content supplying units. These sub-units are front-end computers which in relation to the acquisition of web contents only process and forward the requests. These front-end computers TE-P1 interact with a single back-end computer TE-P2 which constitutes the second part of the tracking engine. The interaction between these computers is indicated by arrows A1 to A5.

In this connection the computer TE-P2 also takes on different functions to the sub-units TE-P1. In particular it is responsible for the conversion or transformation of acquired information into the data structure which can then be processed by the analysis unit AS. It also takes on writing of the acquired and converted information into the local database DB. The embodiment of FIG. 4 ensures a fail-safe and resource-optimized possibility for tracking web contents. In particular the sub-units TE-P1, which have only components with low computing power, are configured so as to be redundant. This redundancy is important since the sub-units TE-P1 communicate with external browsers and therefore failure of these sub-units would lead to termination of communication. By contrast only a single second sub-unit TE-P2 is provided which contains components with higher computing power. In this connection advantage is taken of the fact that redundancy of the back-end sub-unit TE-P2 is not required for communication with the external browsers. Failure of unit TE-P2 would no longer allow tracking of the retrieved web contents but the exchange of data between the browsers and the web system would be retained, however. In the embodiment of FIG. 4 resources are thus saved since the components with high computing power are not multiply duplicated in unit TE-P2. Nevertheless the computer system is fail-safe since the sub-units TE-P1 that are critical to failure are configured so as to be redundant.

Figure 5:
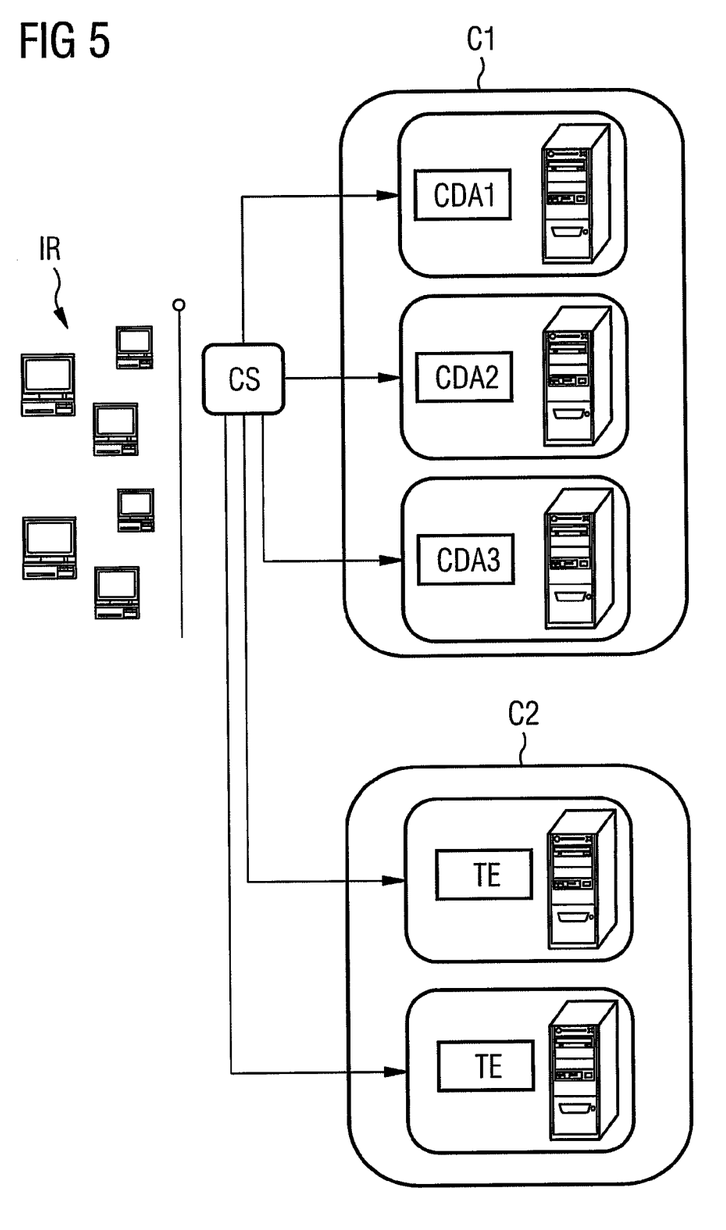

FIG. 5 shows an alternative possibility for integration of an acquisition unit in a web system. The web system in FIG. 5 again includes a plurality of content supplying units CDA1 to CDA3, it being possible for browsers to access the supplied web contents in the internet IR via a content switch CS. The content supplying units form a computer cluster C1. In contrast to the embodiment of FIG. 3 the tracking engines TE are not divided into two sub-units, rather the tracking engines are arranged as a whole in a separate cluster C2, two redundant tracking engines TE being provided in the embodiment of FIG. 5, whereby the stability of the system is increased.

Figure 6:
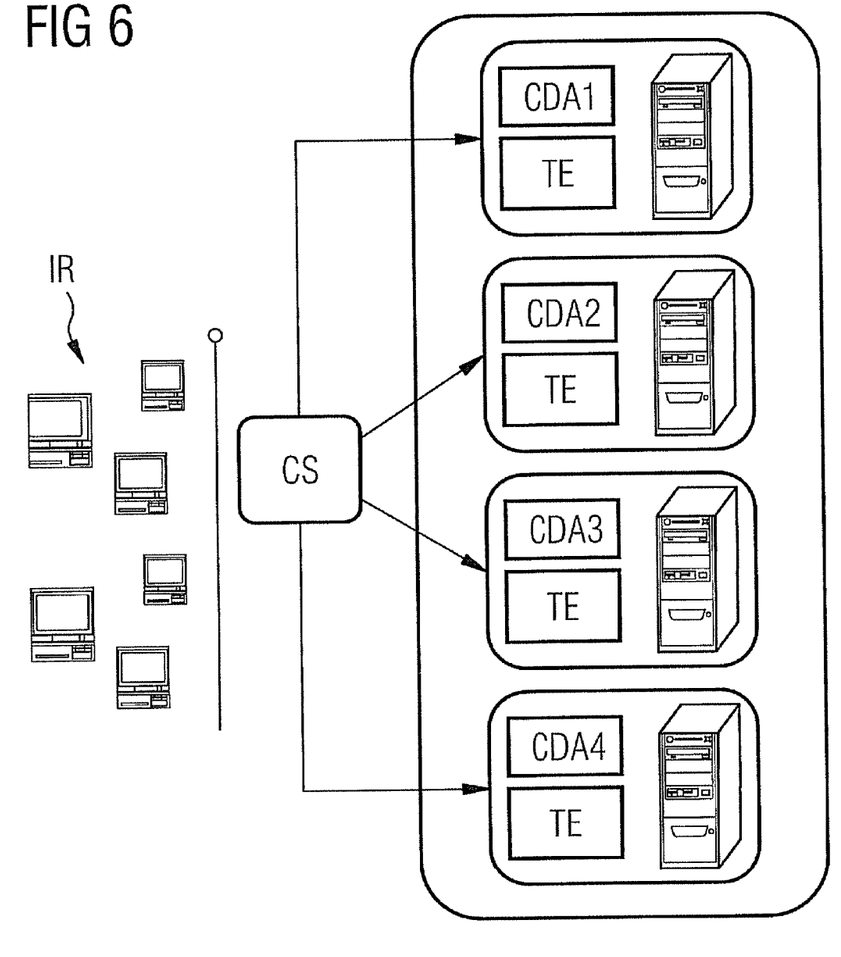

FIG. 6 is a further possible embodiment for integration of acquisition units in a web system. Analogously to the embodiment of FIG. 5, the web contents of the web system are retrieved in the internet IR by browsers via a content switch CS. The web system contains four content supplying units CDA1, CDA2, CDA3 and CDA4 in this connection, four redundant tracking engines TE also being supplied. In contrast to FIG. 5 the individual tracking engines TE are not arranged in a separate cluster however, rather they form components of the individual content supplying units CDA1 to CDA4. The method is very fail-safe owing to the high redundancy of the tracking engines.

Figure 7:
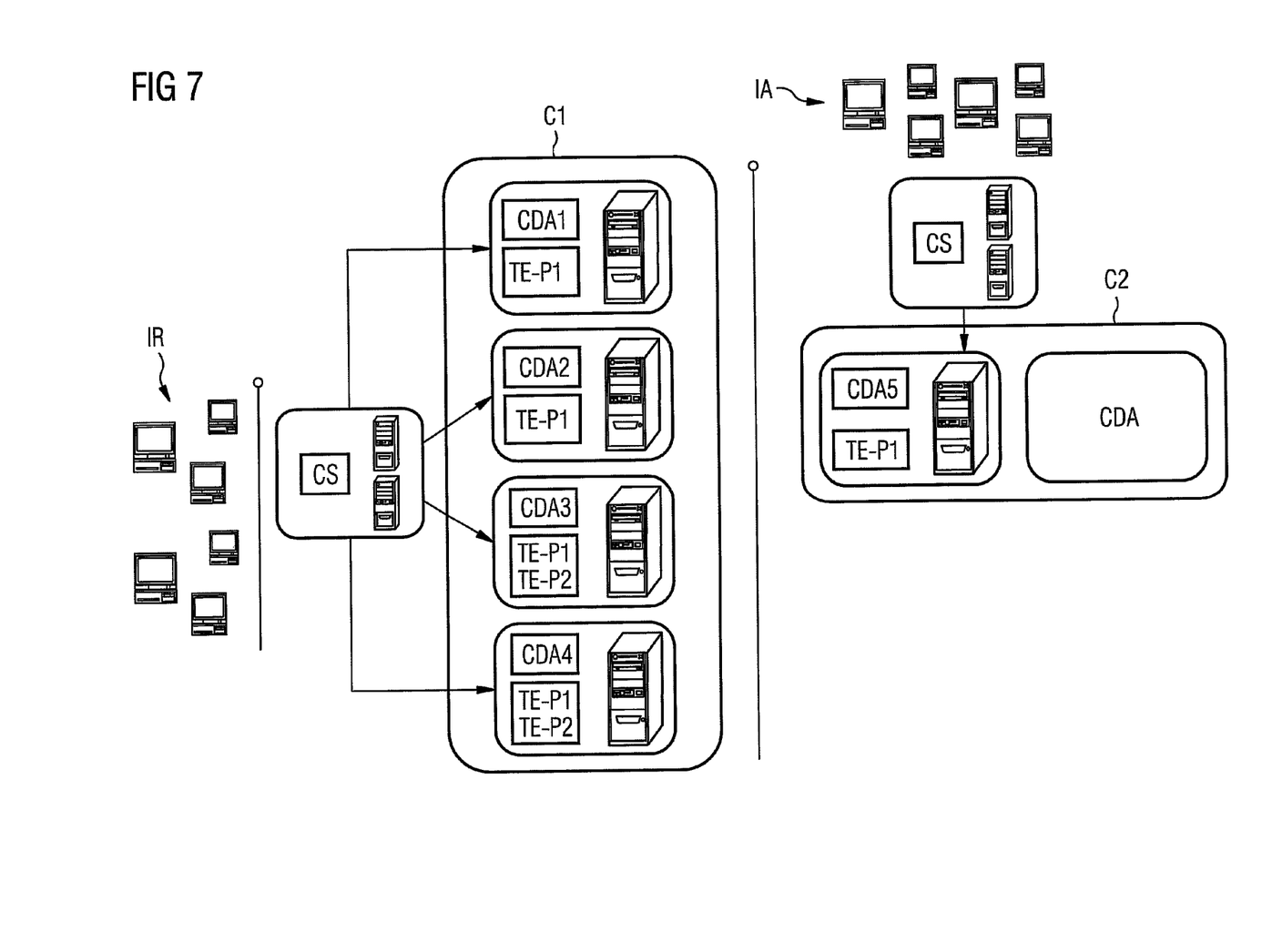

FIG. 7 shows a schematic diagram of a further embodiment of integration of tracking engines in a web system. The embodiment of FIG. 7 is similar to the embodiment of FIG. 4. In particular two computer clusters C1 and C2 are supplied, cluster C1 containing the content supplying units CDA1, CDA2, CDA3 and CDA4. Cluster C2 also includes a large number of content supplying units, only the unit CDA5 being shown and the remainder of the units being indicated by the dummy character CDA. Like the embodiment of FIG. 4 some of the content supplying units, namely units CDA1, CDA2 and CDA3, have only a front end computer TE-P1 which, in relation to the acquisition of web contents, only processes and forwards the requests. In contrast to FIG. 4 two redundant back-end computers TE-P2 are provided, however, which constitute the second part of the tracking engine and together with the computer TE-P1 are provided in the content supplying units CDA3 and CDA4. These computers take on other functions and are used in particular for converting or transforming the acquired information into the data structure for processing in the analysis unit AS. The probability of failure of monitoring of the acquired web contents is reduced by the redundant embodiment of the computers TE-P2.

A description has been provided with particular reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

What is claimed is:

1. A communication system for processing data, comprising:
    a plurality of sub-systems that are web systems, a respective sub-system processing data according to a logic system specific to the respective sub-system and different from each of the other logic systems such that the logic systems of the respective sub-systems do not understand each other, at least some of the sub-systems respectively including:
    a computer processor;
    a content supplying unit that supplies the data of the respective sub-system;
    a content management unit that manages the data of the respective sub-system and augments the data with additional information that is available only locally in the respective sub-system to create augmented data; and
    an acquisition unit that acquires the data and the augmented data of the respective sub-system and produces converted information in a predefined data structure by converting the augmented data of the respective sub-system into a uniform data structure that is the same for all of the sub-systems and stores the converted information in a local database; and
    a common analysis unit, connected to the acquisition units, receiving the converted information from each local database of the at least some of the sub-systems over a common standardized interface, during operation of the communication system, and analyzing the converted information in relation to predefined criteria, wherein the communication system provides web contents for a plurality of users and the data supplied by the content supplying unit includes web contents of the respective sub-system retrieved by the users with web browsers.

2. The communication system as claimed in claim 1, wherein the web systems communicate with the web browsers of the users via the HTTP protocol.

3. The communication system as claimed in claim 2, wherein the web contents retrieved by the users is acquired at least partially via requesting of the web contents by the web browser.

4. The communication system as claimed in claim 3, wherein the web contents retrieved by the users is at least partially transmitted through to the acquisition units by way of redirection from links into HTML web pages displayed by the web browser.

5. The communication system as claimed in claim 4, wherein the links are links to other web pages or links for downloading documents.

6. The communication system as claimed in claim 5, wherein the web contents retrieved by the users is at least one of a URL, storage location or author of a retrieved web page or file, and/or a time at which the web page or file was retrieved.

7. The communication system as claimed in claim 1, wherein the additional information comprises meta information on the web contents, including at least one of the storage location, the author and a storage name of the retrieved web page or file.

8. The communication system as claimed in claim 1, wherein the common analysis unit statistically analyzes the converted information in the predefined data structure.

9. The communication system as claimed in claim 1, wherein each of at least one acquisition unit of the at least some of the sub-systems is divided into at least one first acquisition sub-unit acquiring the data and the augmented data of the respective sub-system and at least one second acquisition sub-unit further processing the data and the augmented data of the respective sub-system.

10. The communication system as claimed in claim 1, wherein at least one of the sub-systems comprises a plurality of content supplying units supplying the web contents for retrieval by the web browser, each content supplying unit containing a first content sub-unit and all first content sub-units splitting a common second content sub-unit.

11. The communication system as claimed in claim 1, wherein at least one of the sub-systems comprises a plurality of content supplying units supplying the web contents for retrieval by the web browser, each content supplying unit containing a first content sub-unit and at least one of the content supplying units also containing a second content sub-unit.

12. The communication system as claimed in claim 1, wherein at least one of the sub-systems comprises a plurality of content supplying units supplying the web contents for retrieval by the web browser, each content supplying unit comprising one of the acquisition units.

13. The communication system as claimed in claim 12, wherein at least one of the sub-systems comprises at least two redundant acquisition units.

14. A method for processing data in a communication system, comprising:
    processing data in each of a plurality of sub-systems, which are web systems, in the communication system according to a logic system specific to the respective sub-system, each of the logic systems being different from each of the other logic systems such that the logic systems of the respective sub-systems do not understand each other;

supplying, by at least some of the sub-systems, the data of the respective sub-system using at least one content supplying unit in each case;

managing, by at least some of the sub-systems, the data of the respective sub-system and augmenting the data with additional information that is available only locally in the respective sub-system to create augmented data using at least one content management unit in each case;

acquiring, by at least some of the sub-systems, the data and the augmented data of the respective sub-system and producing converted information in a predefined data structure by converting the augmented data of the respective sub-system into a uniform data structure that is the same for all of the sub-systems and storing the converted information in a local database using at least one acquisition unit in each case;

during operation of the communication system, sending the converted information from each local database of the at least some of the sub-systems over a common standardized interface from the acquisition units to a common analysis unit; and analyzing the converted information in relation to predefined criteria, by the common analysis unit, wherein the communication system provides web contents for a plurality of users and the data supplied by the content supplying unit includes web contents of the respective sub-system retrieved by the users with web browsers.

* * * * *